US011923099B2

(12) United States Patent
Arafat et al.

(10) Patent No.: US 11,923,099 B2
(45) Date of Patent: Mar. 5, 2024

(54) VORTEX DRIVEN PASSIVE HYDROGEN RECOMBINER AND IGNITER

(71) Applicant: Westinghouse Electric Company LLC, Cranberry Township, PA (US)

(72) Inventors: Yasir Arafat, Pittsburgh, PA (US); John L. Lyons, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 764 days.

(21) Appl. No.: 17/098,603

(22) Filed: Nov. 16, 2020

(65) Prior Publication Data

US 2021/0082588 A1 Mar. 18, 2021

Related U.S. Application Data

(62) Division of application No. 15/591,450, filed on May 10, 2017, now Pat. No. 10,839,966.

(51) Int. Cl.
*G21C 19/317* (2006.01)
*B01D 53/86* (2006.01)
(Continued)

(52) U.S. Cl.
CPC ........... *G21C 9/06* (2013.01); *B01D 53/8671* (2013.01); *B01J 12/007* (2013.01); *G21C 19/317* (2013.01);
(Continued)

(58) Field of Classification Search
CPC ........ G21C 9/06; G21C 19/317; F02M 27/02; B01J 12/007; B01D 2257/108
See application file for complete search history.

(56) References Cited

U.S. PATENT DOCUMENTS 3,755,075 A 8/1973 Henrie
4,891,181 A * 1/1990 Heck .......................... F23Q 3/00
376/300

(Continued)

FOREIGN PATENT DOCUMENTS

CN 110603603 A 12/2019
EP 0929078 A1 7/1999
(Continued)

OTHER PUBLICATIONS

Heck et al., A Two-Pronged Approach to Hydrogen Reduction, Nuclear Engineering International, Wilmington Media (Jul. 1, 1992), 37(456):21-22.

(Continued)

*Primary Examiner* — Lily C Garner
(74) *Attorney, Agent, or Firm* — K&L Gates LLP

(57) ABSTRACT

An igniter apparatus which generates a high speed buoyancy induced vortex to funnel hydrogen and air from the surrounding onto the "igniter core" where an "igniter core" heats up to the auto ignition temperature by the exothermic catalytic oxidation of hydrogen on its surface. Water (vapor) is formed as the product, which inhibits the oxidation reaction, if not stripped away from the catalyst surface. The high velocity of the vortex ensures the stripping of the boundary layer of steam that is formed by the reaction, thus ensuring more active sites are available for hydrogen oxidation. The vortex is formed by channeling an upward draft into a vortex by guided fins. The upward draft is formed by a plate, which is also coated with a hydrogen recombination catalyst. The plate becomes hot by the same catalytic oxidation reaction in the presence of air containing hydrogen.

5 Claims, 4 Drawing Sheets

(51) Int. Cl.
*B01J 12/00* (2006.01)
*G21C 9/06* (2006.01)
*F02M 27/02* (2006.01)

(52) U.S. Cl.
CPC ....... *B01D 2257/108* (2013.01); *F02M 27/02* (2013.01); *Y02E 30/30* (2013.01)

(56) References Cited

U.S. PATENT DOCUMENTS

| | | | | |
|---|---|---|---|---|
| 5,592,521 | A * | 1/1997 | Hill | G21C 19/317 |
| | | | | 423/580.1 |
| 6,071,482 | A * | 6/2000 | Brockerhoff | G21C 9/00 |
| | | | | 588/259 |
| 6,356,613 | B1 * | 3/2002 | Eckardt | G21C 19/317 |
| | | | | 423/580.1 |
| 7,132,085 | B2 * | 11/2006 | Eckardt | B01J 19/2485 |
| | | | | 422/220 |
| 7,523,603 | B2 * | 4/2009 | Hagen | F01K 21/047 |
| | | | | 422/607 |
| 7,707,987 | B2 * | 5/2010 | Guthrie | F01C 21/06 |
| | | | | 123/25 Q |
| 8,917,810 | B2 * | 12/2014 | Marquino | G21C 21/00 |
| | | | | 376/301 |
| 9,177,675 | B2 * | 11/2015 | Vereb | G21C 15/18 |
| 2002/0172318 | A1 * | 11/2002 | Brockerhoff | G21C 9/06 |
| | | | | 376/301 |
| 2009/0225927 | A1 * | 9/2009 | Eckardt | G21C 9/06 |
| | | | | 376/301 |
| 2015/0200022 | A1 | 7/2015 | Hill et al. | |
| 2018/0330834 | A1 * | 11/2018 | Arafat | B01J 12/007 |

FOREIGN PATENT DOCUMENTS

| | | | | |
|---|---|---|---|---|
| EP | 2229681 A2 * | 9/2010 | | G21C 9/06 |
| EP | 2837004 A1 | 2/2015 | | |
| EP | 3076400 A1 | 10/2016 | | |
| EP | 3622536 A1 | 11/2018 | | |
| JP | 2016074554 A | 5/2016 | | |
| KR | 1020160049454 A | 5/2016 | | |
| KR | 20190140482 A | 12/2019 | | |
| WO | WO-0030122 A2 * | 5/2000 | | B01J 19/002 |
| WO | 2013158350 A1 | 10/2013 | | |
| WO | 2018208495 A1 | 11/2018 | | |

OTHER PUBLICATIONS

European Search Report for corresponding European Application No. 18798854.8, dated Nov. 19, 2020.
International Search Report and Written Opinion for International PCT Application No. PCT/US2018/029022 dated Aug. 6, 2018.

* cited by examiner

VORTEX DRIVEN PASSIVE HYDROGEN RECOMBINER AND IGNITER

CROSS-REFERENCE TO RELATED APPLICATIONS

This application is a divisional application claiming priority under 35 U.S.C. § 120 to U.S. patent application Ser. No. 15/591,450, entitled VORTEX DRIVEN PASSIVE HYDROGEN RECOMBINER AND IGNITER, filed May 10, 2017, the entire disclosure of which is hereby incorporated by reference herein.

BACKGROUND

1. Field

This invention pertains in general to hydrogen disposal systems and, more particularly, to hydrogen igniters and hydrogen recombiners for nuclear power plants.

2. Related Art

Conventional water-cooled nuclear reactors are designed to minimize the threat to the integrity of the containment due to a loss-of-coolant accident ("LOCA"). A LOCA can give rise to two distinct problems. First, a break in the reactor coolant circuit leads to the ejection of hot water and steam into the containment atmosphere. Unless systems are employed to remove heat from containment, the pressure and temperature within containment can rise beyond the design limits of the containment vessel. Second, in a severe LOCA involving not only loss of coolant but also failure to inject emergency coolant into the coolant system, the resulting increase in fuel temperature leads to a high temperature reaction between the residual steam in the primary system and the zirconium in the fuel sheathing. In serious cases, complete oxidation of the fuel sheathing may occur. The reaction is exothermic and produces hydrogen. The hydrogen produced from the reaction escapes along with steam from the break point in the primary system into containment atmosphere. In a severe accident, the mass; release rate of hydrogen can be in the order of a kilogram per second. Unless systems are employed to maintain hydrogen concentrations below self ignition limits, a potentially explosive gas mixture can be created in the reactor containment.

New designs of water-cooled nuclear reactors avoid reliance on electrical supplies, service water and operator action in mitigating the effects of a LOCA. Such designs employ passive means to transferred heat from containment atmosphere through the containment walls in order to maintain containment pressure within design limits. For example, steel containment walls and external water cooling from elevated tanks are used to promote heat transfer. Heat from containment atmosphere is transferred to the containment walls by natural convection. Hot steam from the break mixes with air and rises to the top of containment and is cooled by contact with the cold containment wall. The cooler denser mixture falls and a process of natural circulation is begun wherein flow near the walls is down and flow in the central area is up. After the initial blow-down period, the pressure and temperature within containment increases until the rate of condensation of steam on the cold containment wall, and any other cool surfaces, equals the rate of steam discharge from the break.

Conventional reactor design employs a variety of means to mitigate hydrogen build-up. Pre-inerting is one means and involves the generation of an oxygen-depleted atmosphere in containment before or during start-up for normal plant operation. An inert gas (usually nitrogen) is injected into containment to substitute for air that is simultaneously let out to ambient and to reduce the oxygen concentration below the level needed for hydrogen combustion. Pre-inerting is usually applied only to small containments in view of practical difficulties inherent in large designs.

For mid- and larger containment designs, hydrogen igniters are commonly considered for hydrogen mitigation. Hydrogen igniters are conventionally distributed throughout containment, particularly in areas of likely high hydrogen concentration. Hydrogen igniters initiate combustion as soon as its concentration exceeds the ignition threshold, thereby removing the hydrogen by slow deflagration while distributing the energy release spatially and temporally. However, there is a risk in the use of hydrogen igniters that deflagration initiated at one location may propagate into a more sensitive region nearby (i.e., nearer to the release point of the hydrogen) or vent to flammable adjacent volumes (so called jet-ignition) and propagate more vigorously than expected. This may lead to transition from deflagration to detonation which can induce very high loads to the containment structure and equipment. An additional disadvantage to the method of intentional ignition is the unpredictability of the mixing behavior and the type of combustion that may result from intentional ignition of the mixture. This uncertainty has fueled the search for a method of removing hydrogen without deflagration. Further, igniters that rely on AC power could be unavailable in the event of a loss of electrical supply, battery powered igniters are limited to intermittent operation in view of the limited power available and catalytic igniters have limitations relating to the range of mixtures that can be ignited, their response time and their susceptibility to poisoning, fouling or mechanical damage. As a result, it is conventional practice to provide some other means of maintaining hydrogen concentrations below deflagration limits, and to rely on intentional ignition only if such other means are ineffective.

One such other means is the use of hydrogen recombiners. Hydrogen recombiners combine hydrogen and oxygen to produce water, thereby reducing hydrogen concentration in containment. Catalytic recombiners, as opposed to thermal recombiners, are self-starting and do not require external power and, accordingly, can be used as part of a passive system. Although catalytic hydrogen recombiners have been proposed for use in containment, they have not been widely employed in practice due to a number of factors. It is conventional practice in large reactor designs to use containment atmosphere mixing to dilute hydrogen generated at the source of the break throughout containment. This is considered effective as the large containment volume is capable of diluting very large quantities of hydrogen before levels reach deflagration limits. This affords a reasonable period of time within which emergency action can be taken to deal with the LOCA.

In order to operate effectively, hydrogen recombiners require a relatively high flow rate of air. The conventional use of natural circulation of containment atmosphere to effect containment cooling typically does not produce sufficiently high flow rates to render effective passive hydrogen recombiners to deal with large containment volumes. Also, due to the presence of machinery and spaces within containment, the natural convective flow patterns induced by a LOCA are exceedingly difficult to predict or model with the result that choosing optimum locations for passive hydrogen recombiners is an imprecise science at best. As a result, hydrogen recombiners are usually considered for placement in ventilation ducting through which a portion of the containment atmosphere is circulated by fans. This, of course, is not a passive system and is ineffective in the event of a loss of power to drive the circulation fans. Various methods have been proposed to improve the flow of air to recombiners. In DE 3035103, there is disclosed the use of vertical shafts and heating devices in the shafts to improve flow to recombiners by a chimney effect. While the shafts are effective to channel flow to the recombiners, the electric heaters used to generate the upward flow of air rely on external power. In addition, the large shafts present obvious physical difficulties in their integration with the equipment in containment.

In view of their many limitations, hydrogen recombiners have found acceptance only for the routine removal of hydrogen produced from radiolysis and corrosion. For accident control applications, commercial reactors have not heretofore relied exclusively on hydrogen recombiners alone, but instead additionally provide for igniters and/or inerting. There is, therefore, a need to improve the conditions under which hydrogen can be removed by catalytic recombiners.

SUMMARY

This invention achieves the foregoing objective by providing a passive hydrogen recombiner and igniter comprising a substantially horizontal, metallic plate having an underside coated with a hydrogen recombination catalyst, supported in a peripheral housing having a first gaseous intake below the substantially horizontal, metallic plate and a first gaseous outlet around a periphery of the substantially horizontal, metallic plate. A second gaseous intake through the housing and through a first set of swirl vanes is provided substantially proximate to and in communication with an upper side of the substantially horizontal, metallic plate, with the first set of swirl vanes configured to create a vortex out of a second gas traversing the second gaseous intake. A second gaseous outlet is provided through an upper portion of the housing through which the vortex exits. A first passive igniter is supported proximate the first gaseous intake and a second passive igniter is supported proximate the second gaseous outlet.

Preferably, the hydrogen recombination catalyst is either platinum or palladium or a combination thereof and the underside of the substantially horizontal, metallic plate includes downwardly projecting vanes covered with the hydrogen recombination catalyst, structured to direct a first gas entering the first gaseous intake to the first gaseous outlet. In one embodiment, the first gaseous outlet extends up through an interior of at least some of the first set of swirl vanes and exits outside the second gaseous outlet. Desirably, the first set of swirl vanes are structured to transfer heat from the first gas traveling through the swirl vanes to the second gas entering the second gaseous intake. Preferably, the first igniter is a platinum or palladium wire that is wound as a spring to increase its surface area and the second igniter is powered by the vortex. The second igniter may be a rotating device that accumulates charge, similar to a van de Graf generator, to create a spark as an ignition activation energy, a rotating device that drives an electric generator that charges a capacitor, which is structured to throw a spark once a particular voltage is reached, or a rotating device that drives a piezoelectric to create a spark.

In another embodiment, the second gaseous outlet includes a cover spaced from the second gaseous outlet so the second gas can exhaust from under the cover. An upper side of the substantially horizontal, metallic plate may have a second set of swirl vanes attached to its surface and the second set of swirl vanes are configured to be co-directional with the vortex. The upper side of the substantially horizontal, metallic plate may also be substantially covered with a hydrogen recombination catalyst.

The invention also contemplates a method of recombining and igniting hydrogen comprising the step of passively collecting a first gas, potentially having hydrogen as a component, through a first gaseous intake of a housing through which the first gas will be processed. The method directs the first gas from the first gaseous intake to an underside of a substantially horizontal, metallic plate coated with a hydrogen recombination catalyst, along an underside of the substantially horizontal, metallic plate to a first gas outlet at a periphery of the substantially horizontal, metallic plate. The method also passively collects a second gas, potentially having hydrogen as a component, through a second gaseous intake through the housing and through a first set of swirl vanes substantially proximate and in communication with an upper side of the substantially horizontal, metallic plate with the swirl vanes configured to create a vortex out of the second gas traversing the second gaseous intake. The method then exits the vortex at a second gaseous outlet through an upper portion of the housing and supports a first passive igniter at an entrance to the first gaseous intake and a second passive igniter proximate the second gaseous outlet. Preferably, the second igniter is powered from the vortex and may be a rotating device that accumulates a charge to create a spark as an ignition activation energy. Desirably, the method includes a cover spaced from the second gaseous outlet and includes the step of shielding the second igniter.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
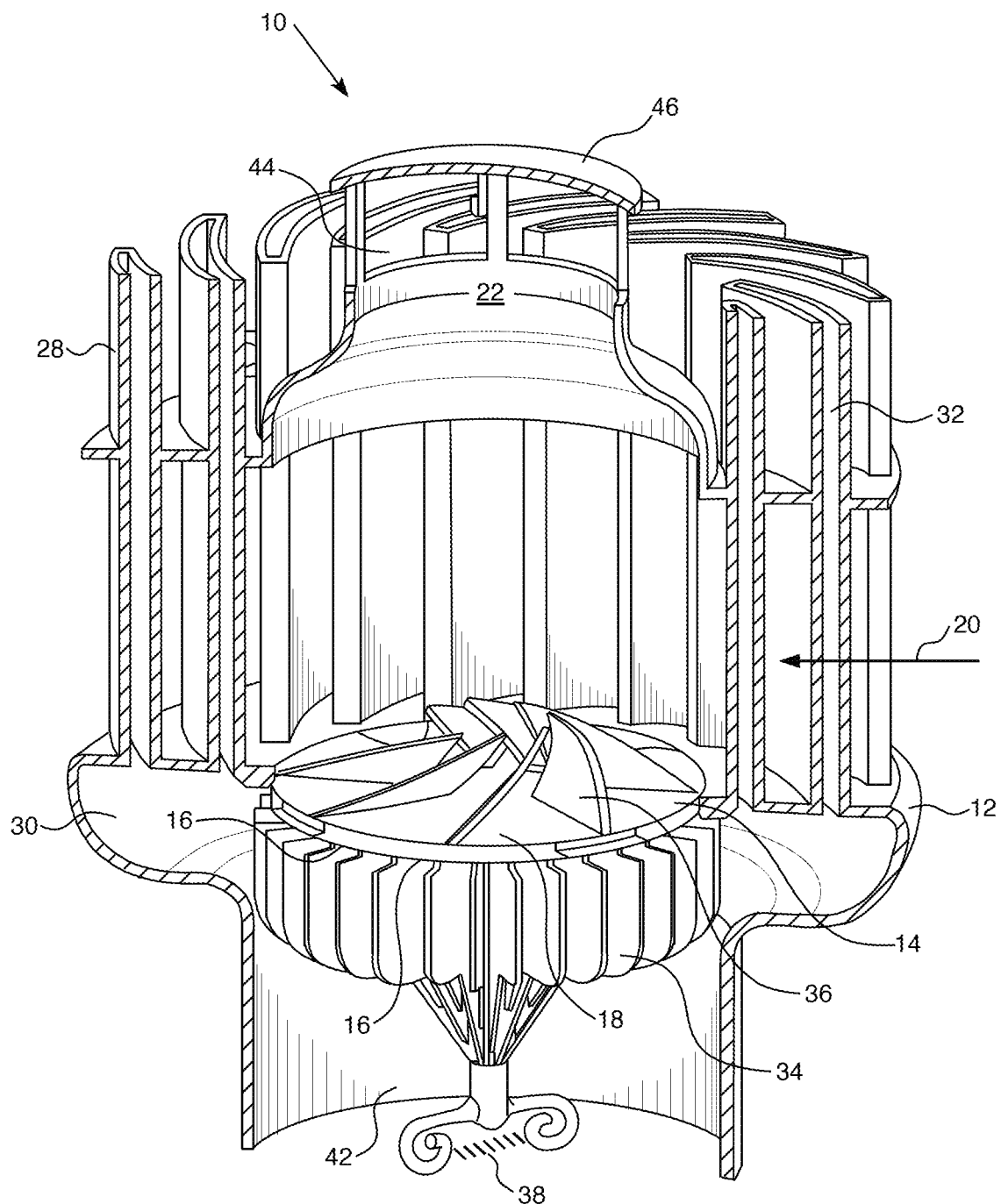
FIG. 1 is a three dimensional view, with portions cutaway, of one embodiment of this invention.

As previously discussed, in a severe accident scenario at a nuclear power plant, hydrogen explosions within the containment are mitigated by i) PARS (Passive Autocatalytic Recombiners), which passively recombine hydrogen and oxygen from the air to form water vapor (employed generally in large, dry containments), ii) inerting the atmosphere (practically useful only in very small containments), and iii) electrically powered heating elements (active igniters), which heat up to a temperature above the ignition temperature of hydrogen at the lower flammability limit (used in ice condenser style containments, BWR Mark III containments and all containments of water cooled reactors licensed after Oct. 16, 2003). It is the objective of this invention to replace the active igniter technology.

Current active igniters are essentially thermal glow plugs that are placed in strategic locations inside the containment where hydrogen is expected to form or accumulate. During an accident where offsite AC power is available, the back-up power is not needed and the igniters are reliable. In accident scenarios where offsite AC power is lost there are generally two independently powered groups of backups, each having approximately 33 igniters. One train has backup powered diesel generators, while the other train is powered by batteries. In some cases a redundant diesel generator or a portable generator is provided. If running on batteries, backup is generally designed for four hours of continuous power supply.

The main concerns with current igniters are the extensive cabling they require, the difficulty with maintenance during outages and the need for external power to operate. Moreover, over time, these cables can get worn out and need to be replaced. Therefore, there is a need for passive, self-contained hydrogen igniters that do not rely on external power, associated wiring and controls. Unlike the current igniters, the system disclosed herein meets these criteria. Moreover, the apparatus disclosed herein do not require operator intervention to function.

In the past there were passive igniter designs that employed a hydrogen recombination catalyst. There are a few critical challenges encountered in using such a passive igniter. First, the heat-up process of the igniter is slow due to the slow natural convective air flow through the catalyst. Second, as the reaction commences, water is formed on the catalyst surface which tends to inhibit the recombination reaction. As the reaction continues the steam that is generated from the exothermic reaction removes itself once the temperature of the plates rises and allows a higher velocity of air flow to strip away the water molecules. This velocity is reached once the plates reach temperatures higher than approximately 500° C.

The passive igniter disclosed herein produces a hot surface by catalytic oxidation of hydrogen in air; naturally replenishes a continuous air flow across the catalytic surfaces; and naturally forms a vortex that has a high velocity (as compared to vertical buoyancy) to boost autocatalytic performance by improving mass transfer to and from the catalyst. All of these three factors allow faster heat-up of the passive igniter at lower concentrations of hydrogen compared to a passive igniter using a simple upward draft.

The invention described herein shown in FIGS. 1-4 includes a substantially horizontal, metallic plate 14, and the bottom portion 16 of which is coated with a hydrogen recombination catalyst such as platinum or palladium or a mixture thereof. The plate, preferably, is made from a material having a high thermal conductivity. In the presence of hydrogen and air the bottom of the plate recombines the hydrogen on its surface, thus generating heat. Once the bottom 16 of the plate 14 gets heated, the top 18 also heats-up. As the top 18 of the plate 14 gets heated, the air above the top of the plate heats-up and the adjacent air rises due to its buoyancy. Colder air from the surroundings is drawn in to take its place. However, the passageway of the fresh inlet air around the plate is lined with radially spiraled vanes 28. These vane plates 28 force the inlet air to converge into a vortex 24, similar to a naturally occurring dust devil in a desert. This vortex 24 moves upwards and exits through the narrow chimney 22. An "igniter core" 26, is strategically placed in the mouth of the chimney 22. Similar to the bottom of the horizontal plate, the igniter core is also coated with hydrogen recombination catalyst. The high velocity of the vortex 24 ensures a high recombination reaction rate by 1) replenishing the catalyst with fresh reactants, and 2) by removing the water molecules (a byproduct of the catalytic reaction) from the catalyst surface. The horizontal plate 14, on the other hand, need not be heated to a high temperature. Past studies have shown that a very high velocity (8 to 10 m/s) vortex formation can be achieved with only a 100° C. temperature difference between a hot surface and the ambient air. Therefore, at lower hydrogen concentrations the horizontal plate 14 can generate a very high velocity (8 to 1 1 m/s) vortex compared to a vertical convection draft (0.5 to 1 m/s) requiring a temperature difference of at least greater than 200-500° C.

Figure 2:
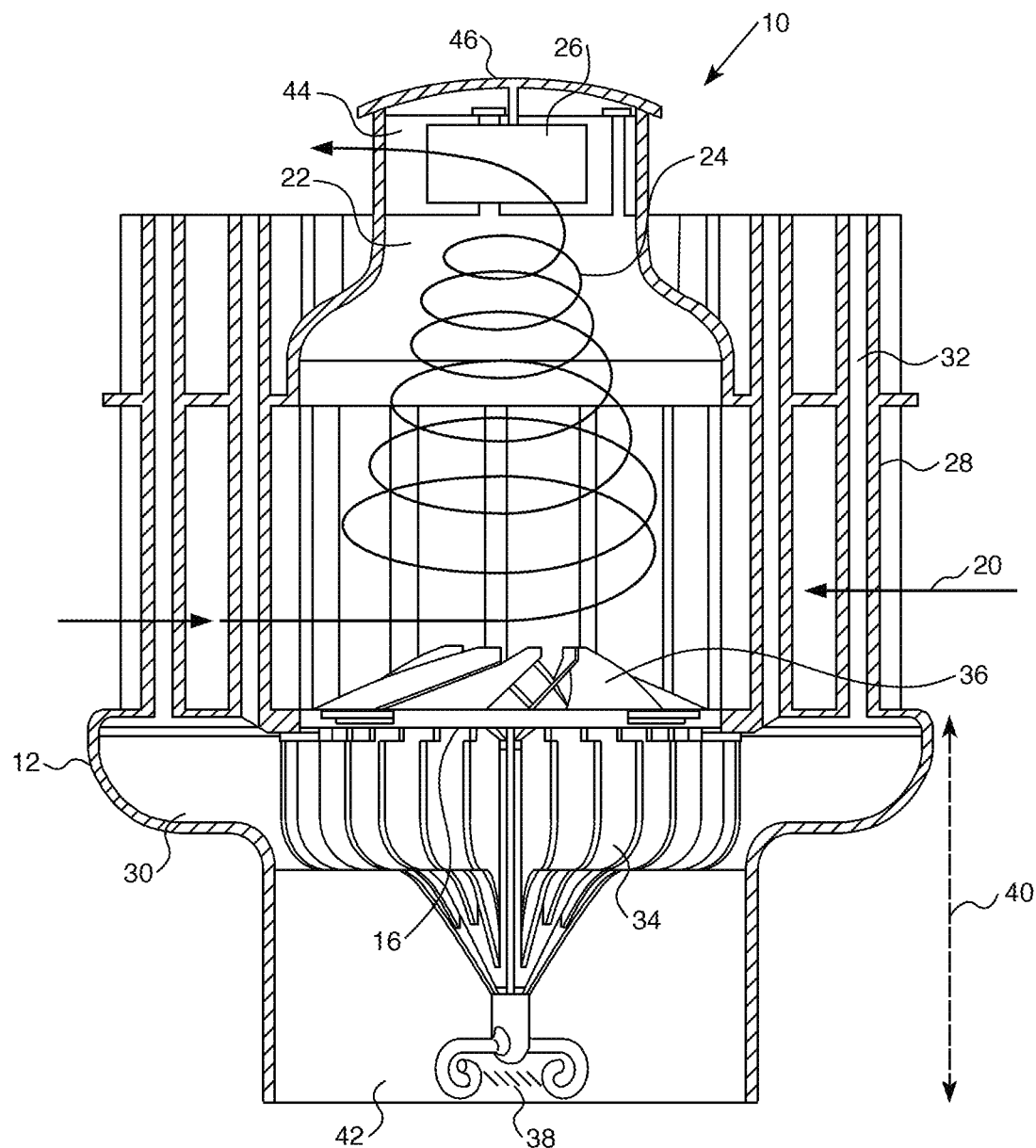
FIG. 2 is a two dimensional view, with portions cutaway, of the recombiner, igniter of this invention.
Figure 3:
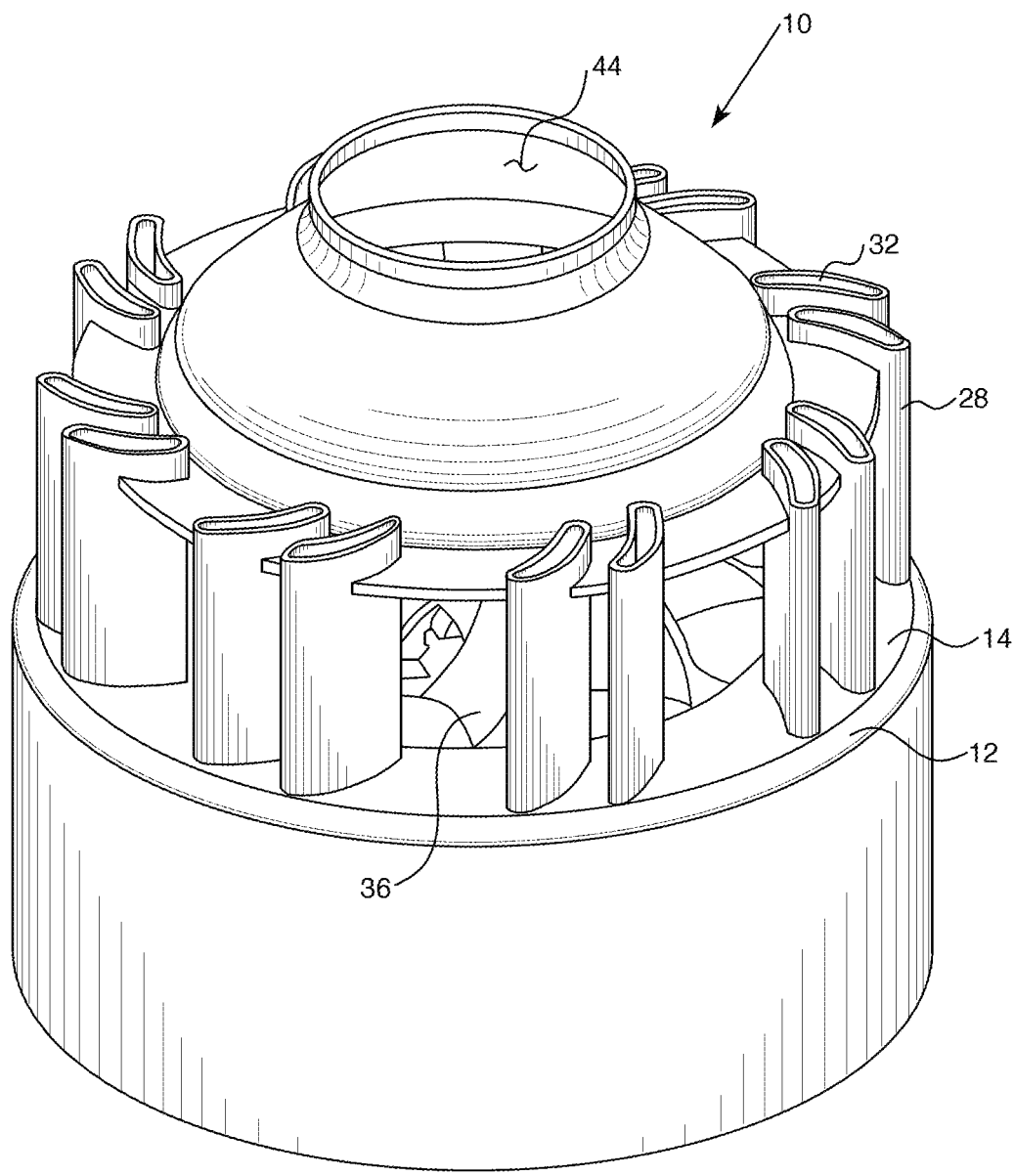
FIG. 3 is a perspective view of the hydrogen recombiner igniter of this invention.
Figure 4:
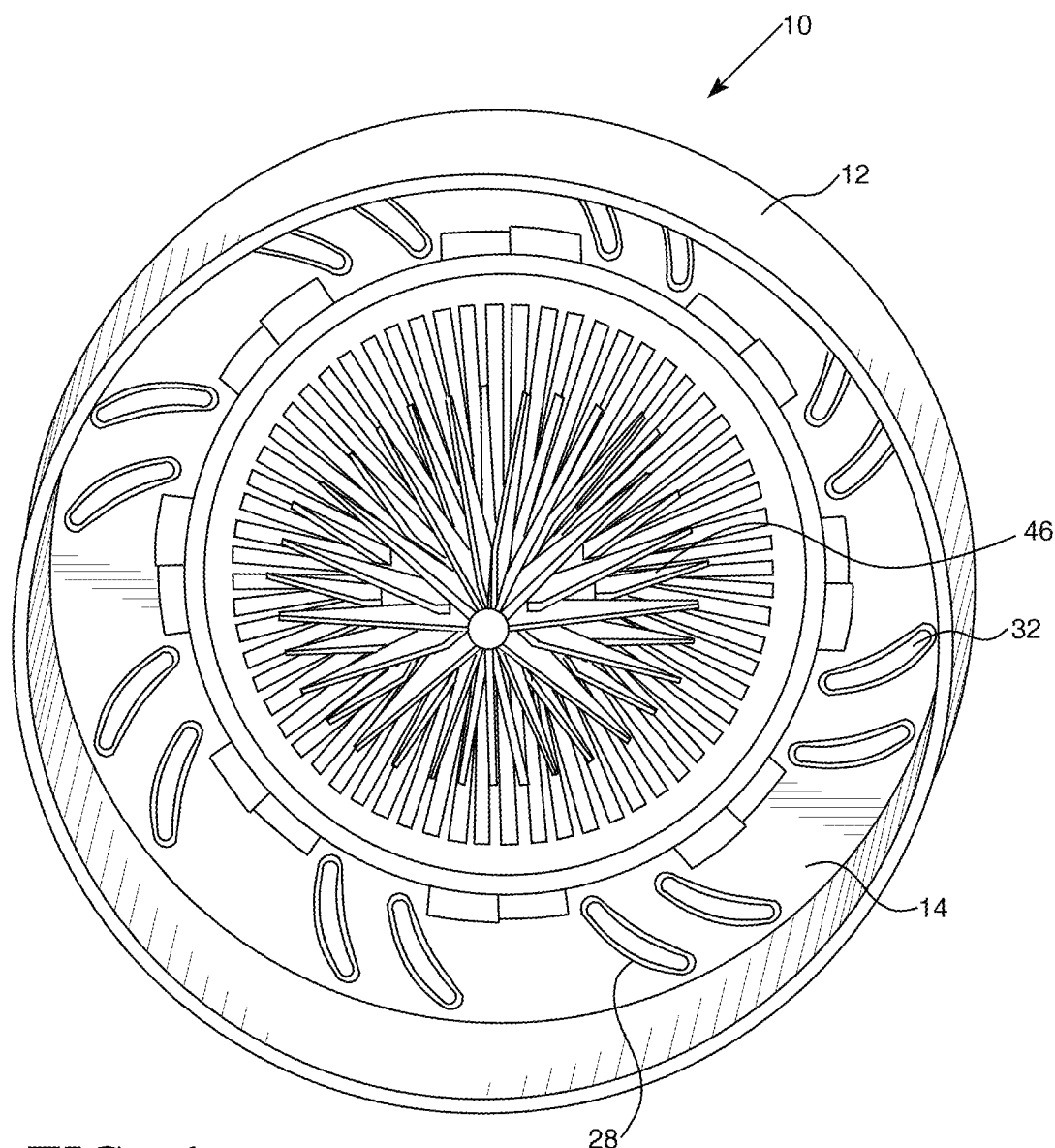
FIG. 4 is a plan sectional view of the hydrogen recombiner igniter shown in FIG. 3.

The bottom 16 of the horizontal plate 14 needs to be exhausted through a passageway 30 in the housing 12 that does not obstruct the vortex flow 24. Therefore, the interior 32 of the guided fins or vanes 28 serves that purpose. The interior 32 of the guided vanes 28 forms a passageway for heated air from below the horizontal plate 14 to rise up and exit the apparatus as shown in FIG. 2. This also allows preheating of the vortex inlet air 20 as it flows along the exterior of the vanes 28. The bottom 16 of the horizontal plate 14 can have fins 34 to 1) allow a larger catalyst surface area, and 2) guide the hot air in a more hydrodynamically favorable path to the interior 32 of the guide fins 28 and exit the apparatus 10. Similarly, the top 18 of the horizontal plate 14 can be provided with fins 36, co-directional to the vortex flow, to allow better heat transfer to the air from the horizontal plate. Instead of fins 36, vertical pins, or flat plates, or other plate geometries can be employed to effectively transfer heat from the pins or plates to air, can be used. To enhance the heating of the vortex 24 the top 18 of the horizontal plate 14 can also be coated with a hydrogen recombination catalyst. FIGS. 1-4 show the preferred embodiment using the aforementioned principles. There is also a coiled spring igniter 38 at the mouth, i.e., lower air intake 42, of the preheater section 40 below the horizontal plate 14, which can also induce ignition to fresh air (with hydrogen) entering the intake 42.

An alternate embodiment to the igniter 26 at the vortex exit 44 is to utilize a rotating mechanism to accumulate charge on a body (similar to a van de Graf generator) to create a spark as the ignition activation energy. In addition, a third set of vanes 36 can be formed on the upper surface 18 of the substantially horizontal, metallic plate 14 to force the buoyant, heated air layer to rotate as it rises, forming a columnar vortex that can be anchored and which draws in additional hot air to sustain itself to provide a new thermo-mechanical link between chemical energy and electrical energy. Additionally, the upper surface 18 of the substantially horizontal, metallic plate 14 and the third set of vanes 36 can be coated with the hydrogen recombination catalyst.

Another alternate embodiment for the upper igniter 26 is to have the vortex 24 drive an electric generator that charges a capacitor, which will throw a spark once a particular voltage is reached. An additional, alternate embodiment for the upper igniter 26 is to have a rotating mechanism driven by the vortex 24, drive a piezoelectric device. One such rotating mechanism could be a shaft rotatably attached to the upper center of the substantially horizontal, metallic plate 14 with the shaft extending vertically with a vane extending radially from and spirally around the surface of the shaft.

Thus, this invention provides a passive hydrogen igniter 10 that is self-actuating and self-sustaining. The buoyancy induced vortex 24 allows high velocity air to activate the igniter core, thus allowing igniter to reach auto ignition temperature faster and at lower concentrations. The igniter allows the vortex 24 to be formed by low plate temperature, thus allowing ignition at lower concentrations of hydrogen (above 4%, less than 8 mol % hydrogen in air). The guided fins 28 have dual functions: 1) the exterior surface guides inlet air to form the vortex; 2) the interior surface provides the passageway for the exhaust hot air from the bottom 16 of the substantially horizontal, metallic plate 14 recombination reaction; and 3) the interior hot air preheats the vortex inlet air 20, thus reducing time to ignition. The vortex 24 can run other electrical spark generators by using a vertical axis rotating vane, which is also self-driven. The spring igniter 38 can also cause ignition once the velocity in the preheater inlet 42 rises. The chimney hood 46 prevents exposure of the catalytic surfaces of the igniter core to containment spray, water, etc., while the other catalytic surfaces (lower fins 34 of the substantially horizontal, metallic plate 14 and the spring igniter 38) are protected by the design of the apparatus. A larger version of this design can be designed for dual functionality of existing PARs (passive autocatalytic recombiners), which are used to denature hydrogen over large quantities before it reaches the lower flammability limit (<4%) and active igniters, which ignites the excessive hydrogen before reaching an explosive level (>10%). PARs are generally slower and this embodiment can speed up the process and enhance plant safety for design basis and beyond design basis accidents.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of recombining and igniting hydrogen comprising the steps of:

passively collecting a first gas, potentially having hydrogen as a component, through a first gaseous intake of a housing through which the first gas will be processed;

directing the first gas from the first gaseous intake to an underside of a substantially horizontal, flat metallic plate coated with a hydrogen recombination catalyst, along an underside of the substantially horizontal, flat metallic plate to a first gas outlet at a periphery of the substantially horizontal, metallic plate;

passively collecting a second gas, potentially having hydrogen as a component, through a second gaseous intake through the housing and through a first set of swirl vanes substantially proximate and in communication with an upper side of the substantially horizontal, flat metallic plate, with the swirl vanes configured to create a vortex out of the second gas traversing the second gaseous intake;

exiting the vortex at a second gaseous outlet through an upper portion of the housing;

supporting a first passive igniter at an entrance to the first gaseous intake; and supporting a second passive igniter proximate the second gaseous outlet.

2. The method of claim 1 wherein the first gaseous outlet extends up through an interior of at least some of the first set of swirl vanes and exits outside the second gaseous outlet.

3. The method of claim 1 including the step of powering the second igniter from the vortex.

4. The method of claim 3 wherein the second igniter is a rotating device that accumulates charge to create a spark as an ignition activation energy.

5. The method of claim 1 wherein the second gaseous outlet includes a cover spaced from the second gaseous outlet including the step of shielding the second igniter.

\* \* \* \* \*